(12) United States Patent
Hellbusch et al.

(10) Patent No.: US 8,740,249 B1
(45) Date of Patent: Jun. 3, 2014

(54) COMBINE HEADER TRANSPORT TRAILER

(71) Applicants: James A. Hellbusch, Columbus, NE (US); Patrick K. Sokol, Columbus, NE (US)

(72) Inventors: James A. Hellbusch, Columbus, NE (US); Patrick K. Sokol, Columbus, NE (US)

(73) Assignee: DUO Lift Manufacturing Co., Inc., Columbus, NE (US)

( * ) Notice: Subject to any disclaimer, the term of this patent is extended or adjusted under 35 U.S.C. 154(b) by 0 days.

(21) Appl. No.: 14/079,747

(22) Filed: Nov. 14, 2013

Related U.S. Application Data

(63) Continuation-in-part of application No. 13/915,135, filed on Jun. 11, 2013.

(51) Int. Cl.
*B62D 63/06* (2006.01)
*B60P 1/04* (2006.01)

(52) U.S. Cl.
USPC ........... 280/789; 280/781; 280/140; 280/141; 280/142; 280/143; 280/144; 280/145; 280/146; 280/147; 280/148; 280/763.1; 410/44; 410/2; 410/77; 410/80; 414/470; 298/17.6; 298/17.7

(58) Field of Classification Search
USPC ......... 280/789, 781, 140, 141, 142, 143, 144, 280/145, 146, 147, 148, 656, 638, 763.1; 410/44, 2, 77, 80; 414/470; 298/17.6, 298/17.7; 254/418
See application file for complete search history.

(56) References Cited

U.S. PATENT DOCUMENTS

| | | | | |
|---|---|---|---|---|
| 4,084,789 A * | 4/1978 | Francis | | 254/418 |
| 4,784,369 A * | 11/1988 | Bock | | 254/45 |
| 5,040,825 A | 8/1991 | Kuhns | | |
| 5,333,904 A | 8/1994 | Kuhns | | |
| 5,529,447 A * | 6/1996 | Bruns et al. | | 410/2 |
| 6,047,989 A * | 4/2000 | Wood | | 280/789 |
| 6,428,047 B1 | 8/2002 | Kaderabek | | |
| 7,490,856 B1 | 2/2009 | Kuhns | | |
| 8,616,812 B2 * | 12/2013 | Bergen et al. | | 410/44 |
| 2007/0152437 A1 * | 7/2007 | Baxter et al. | | 280/763.1 |

* cited by examiner

*Primary Examiner* — Joseph M Rocca
*Assistant Examiner* — Marlon Arce
(74) *Attorney, Agent, or Firm* — Dennis L. Thomte; Thomte Patent Law Office LLC

(57) ABSTRACT

A combine header transport trailer for transporting a combine header. The trailer includes mechanical jacks for raising and lowering the header bar thereon and for moving the header bar inwardly and outwardly with respect to the trailer.

3 Claims, 9 Drawing Sheets

COMBINE HEADER TRANSPORT TRAILER

CROSS REFERENCE TO RELATED APPLICATION

This is a Continuation-In-Part Application of application Ser. No. 13/915,135, filed Jun. 11, 2013 entitled COMBINE HEADER TRANSPORT TRAILER.

BACKGROUND OF THE INVENTION

1. Field of the Invention

This invention relates to a combine header transport trailer and more particularly to a combine header transport trailer which may be used to transport combine headers of various sizes and shapes. More particularly, this invention relates to a combine header transport trailer wherein the header bar of the trailer is easily adjustably moved inwardly, outward, upwardly or downwardly with respect to the trailer by means of a pair of header bar adjustment assemblies, each of which include a mechanical jack.

2. Description of the Related Art

Combine header transport trailers have been utilized for several years for transporting combine headers, after they have been removed from the combine, from one location to another. It is desirable to detach the header from the combine so that the combine and the header may be separately moved over roads to one location to another. If the header is not removed from the combine, the width of the header on the combine makes it extremely hazardous to transport the combine from one location to another.

In most of the prior art combine header transport trailers, the header is positioned endwise on the trailer with the lower rearward end of the header being supported on a pair of back stops or brackets secured to one of the longitudinally extending frame members of the trailer frame with the underside of the header being supported by a longitudinally extending header bar at the other side of the trailer. Some combine header transport trailers have the capability of being able to adjust the position of the header bar to accommodate headers of different sizes and shapes. However, in the prior art transport trailers of which Applicants are aware, no one has previously provided a means for vertically and horizontally adjusting the header bar by means of mechanical jacks. Further, Applicants are not aware of anyone who has been able to move the header bar horizontally with respect to the frame of the trailer and to also vertically raise or lower the header bar through the use of the same pair of mechanical jacks.

The combine header transport trailer of the co-pending application represents a significant advance in the art and which has met with success. However, the electrically operated screw actuators of the co-pending application are fairly expensive and increase the cost of manufacturing the trailer. Further, the electrically operated screw actuators thereof require that a source of electrical power such as batteries be available.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer is provided for the endwise transport of a combine header with the combine header having a forward end, a rearward end, a first end, and a second end. The trailer includes an elongated wheeled frame having a forward end, a rearward end, a first side and a second side. The wheeled frame includes elongated first and second horizontally spaced-apart and longitudinally extending frame members which have forward and rearward ends. A plurality of spaced-apart cross-members, having first and second ends, are secured to the first and second frame members and extend transversely therebetween.

The trailer includes a first elongated and transversely extending header bar support member which has inner and outer ends. The first header bar support member has its inner end pivotally secured, about a horizontal axis, to one of the cross-members rearwardly of the forward end of the wheeled frame. The first header bar support member extends towards the second frame member with the outer end of the first header bar support member being disposed laterally outwardly and above the second frame member. A first slider assembly is selectively longitudinally slidably adjustably mounted on the first header bar support member with the first slider assembly including a locking pin for selectively locking the first slider assembly to first header bar support member. A first support is provided which has upper and lower ends. The upper end of the first support is pivotally secured to the first header bar support member between the inner and outer ends thereof. The lower end of the first support is selectively vertically adjustably secured to the respective cross-member.

The trailer also includes a second elongated and transversely extending header bar support member which has inner and outer ends. The second header bar support member has its inner end pivotally secured, about a horizontal axis, to one of the cross-members forwardly of the rearward end of the wheeled frame. The second header bar support member extends towards the second frame member with the outer end of the second header bar support member being disposed laterally outwardly and above the second frame member. A second slider assembly is selectively longitudinally slidably adjustably mounted on the second header bar support member with the second slider assembly including a locking pin for selectively locking the second slider assembly to the second header bar support member. The trader also includes a second support having upper and lower ends. The upper end of the second support is pivotally secured to the second header bar support member between the inner and outer ends thereof. The lower end of the second support is selectively vertically adjustably secured to the respective cross-member.

The trailer further includes an elongated and longitudinally extending header bar having a forward end and a rearward end. The header bar is mounted on the first and second slider assemblies and extends therebetween.

A first header bar adjustment assembly is provided which is used to selectively move the first slider assembly inwardly or outwardly on the first header bar support member to move the forward end of the header bar inwardly or outwardly with respect to the first header bar support member. The first header bar adjustment assembly may also be used to selectively raise or lower the outer end of the first header bar support member to raise or lower the forward end of the header bar.

A second header bar adjustment assembly is also provided which is used to selectively move the second slider assembly inwardly or outwardly on the second header bar support member to move the rearward end of the header bar inwardly or outwardly with respect to the second header bar support member. The second header bar adjustment assembly may also be used to selectively raise or lower the outer end of the second header bar support member to raise or lower the rearward end of the header bar.

It is therefore a principal object of the invention to provide an improved combine header transport trailer.

A further object of the invention is to provide a combine header transport trailer wherein the header bar thereof may be easily adjusted through the use of a pair of mechanical jacks.

A further object of the invention is to provide a trailer of the type described wherein a pair of mechanical jacks may be used to not only move the header bar laterally outwardly or inwardly with respect to the trailer but which may also be used to raise and lower the header bar with respect to the trailer.

A further object of the invention is to provide a combine header transport trailer wherein the header bar thereof may be adjustably moved inwardly, outwardly, upwardly or downwardly by one person without tools.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
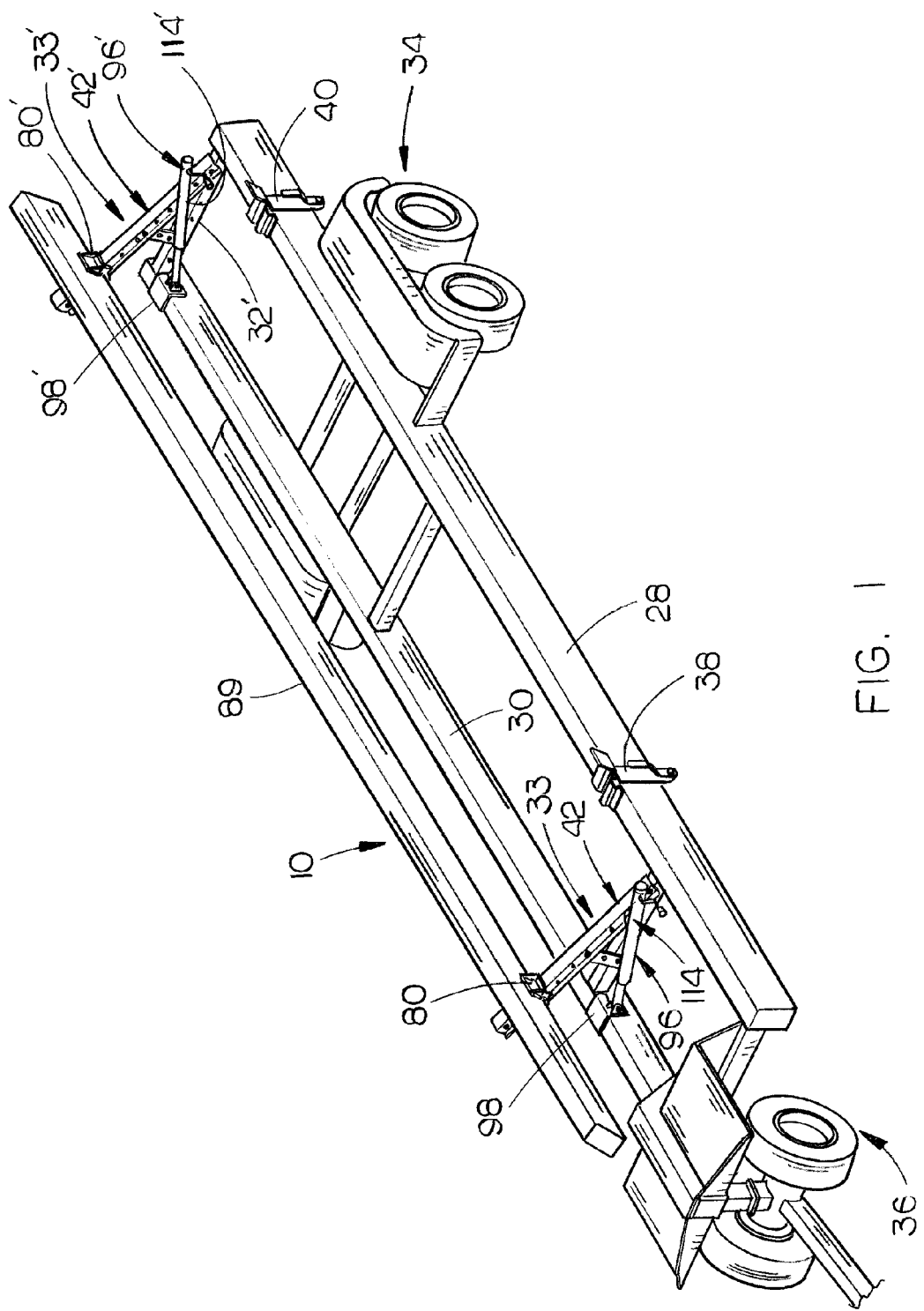
FIG. 1 is a front perspective view of the trailer of this invention.
Figure 2:
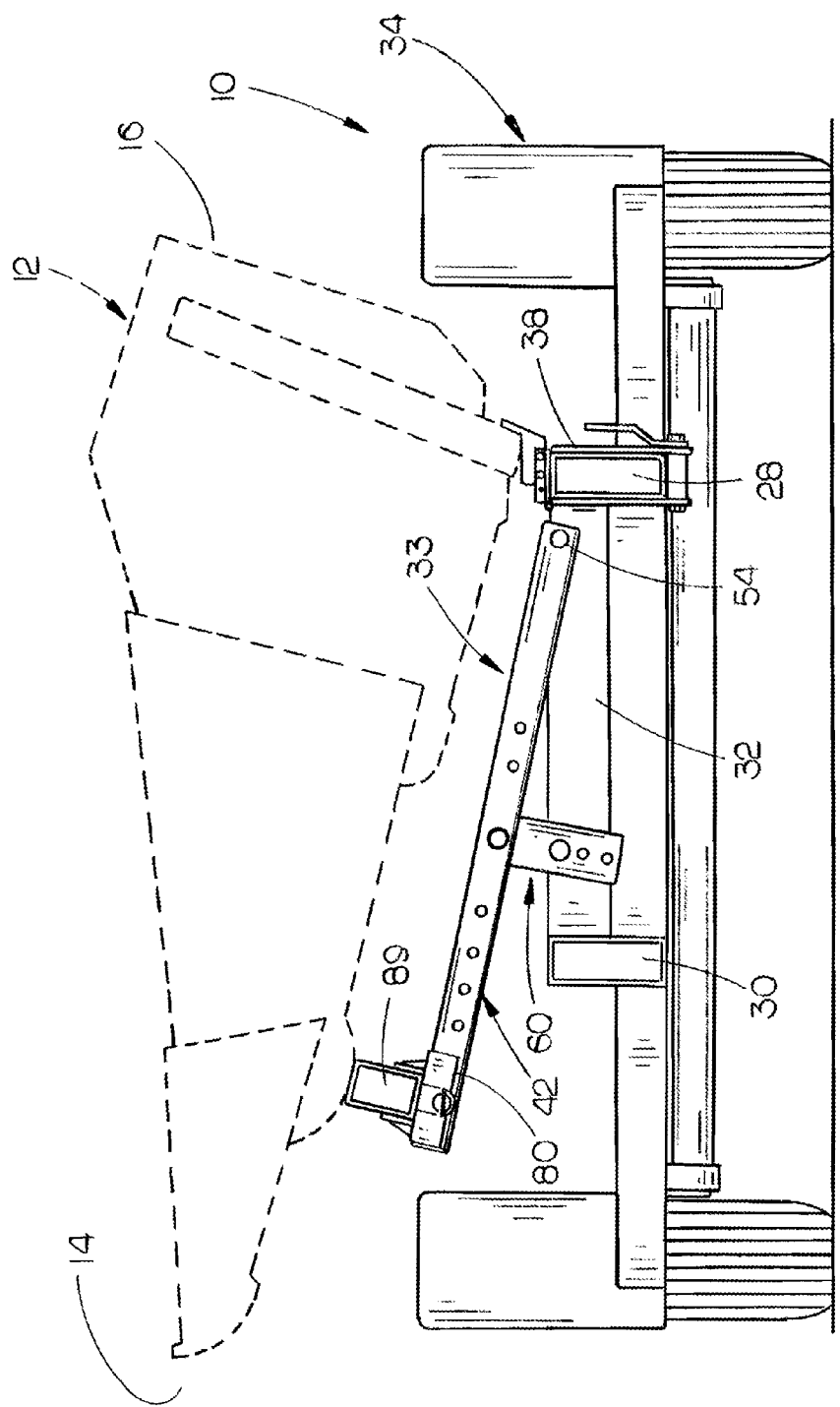
FIG. 2 is a partial front view of the trailer of this invention prior to the header bar adjustment assembly being mounted thereon.
Figure 3:
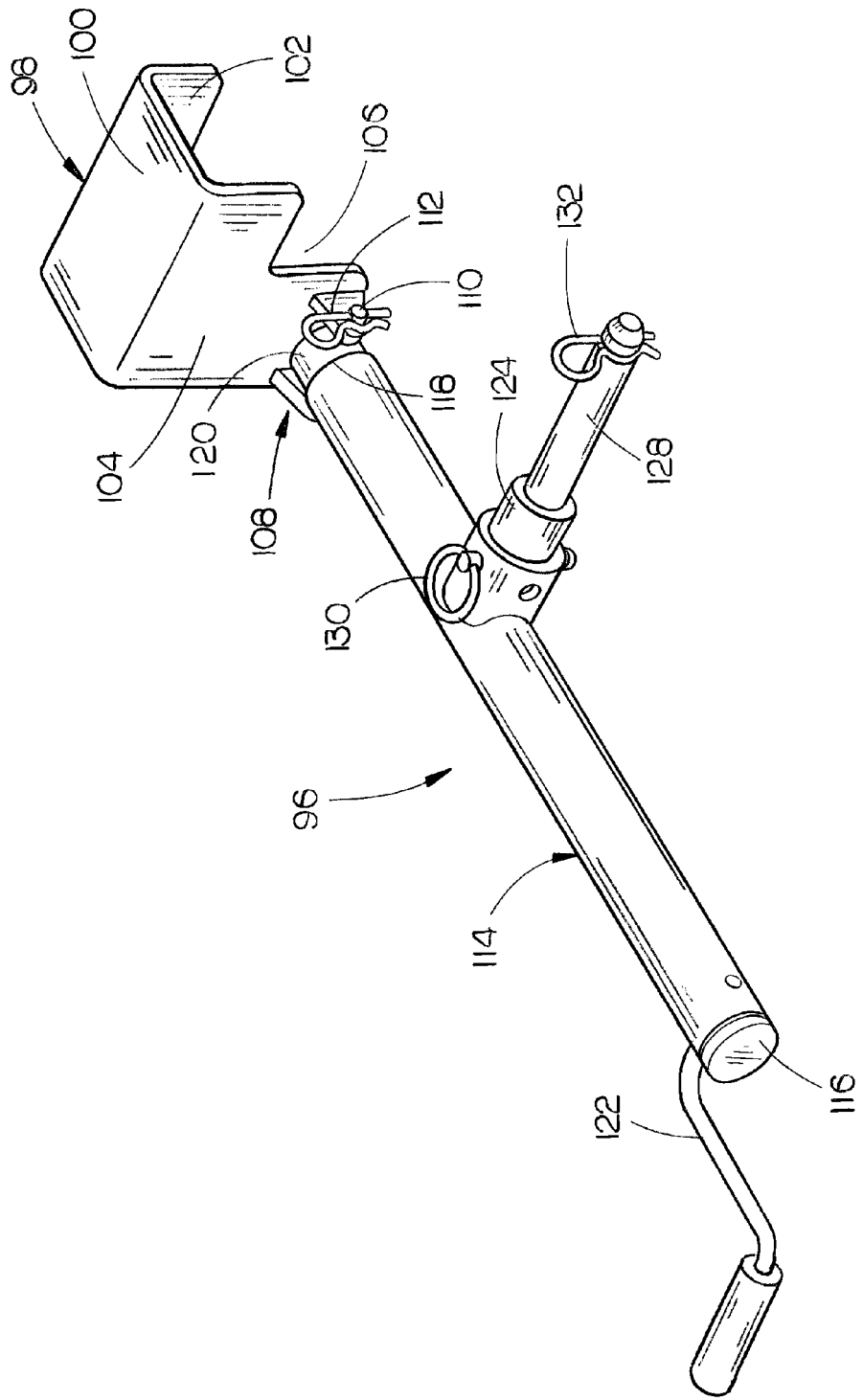
FIG. 3 is a perspective view of the header bar adjustment assembly of this invention.
Figure 4:
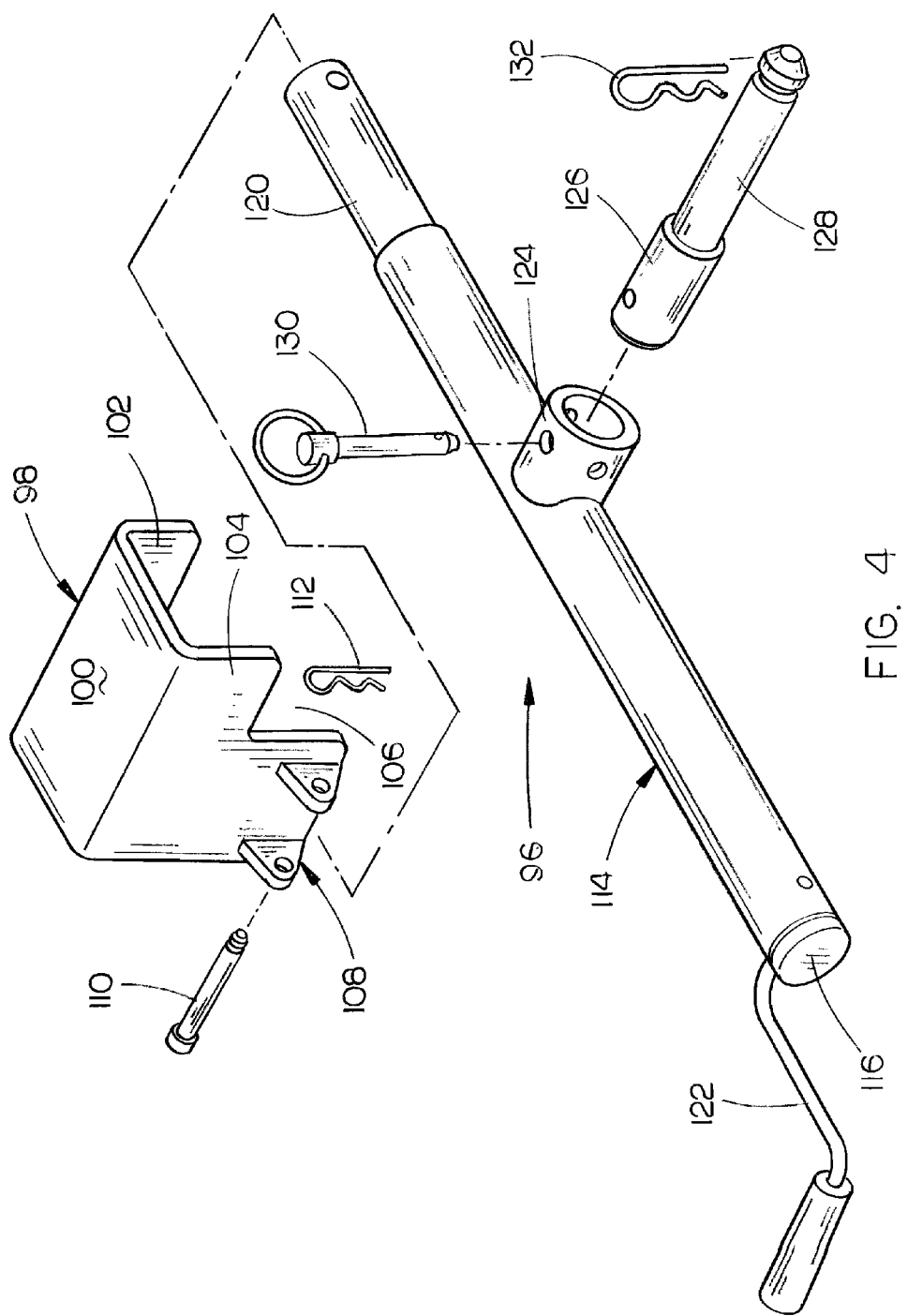
FIG. 4 is an exploded perspective view of the header bar adjustment assembly of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The trailer of this invention is designated by the reference numeral 10 and which is designed for the endwise transport of a combine header 12. Header 12 is conventional in design and includes a forward end 14, rearward end 16, and opposite ends. Trailer 10 includes a wheeled frame 18 having a forward end 20, a rearward end 22, a first side 24 and a second side 26. Wheeled frame 18 includes a first elongated and longitudinally extending frame member 28 and a second elongated and longitudinally extending frame member 30 which is horizontally spaced from frame member 28. A cross-member 32 is secured to and extends between frame members 28 and 30 rearwardly of the forward end 20 of the frame 18. Cross-member 32' is secured to and extends between the frame members 28 and 30 at the rearward end of the frame 18. A plurality of other spaced-apart cross-members also extend between the frame members 28 and 30 in conventional fashion.

The numeral 33 refers to a header bar support structure at the forward end of the header 10 which is associated with cross-member 32 as will be discussed in more detail hereinafter while the numeral 33' refers to a header bar support structure at the rearward end of the trailer 10 which is associated with cross-member 32'. Inasmuch the header bar support structure 33 on cross-member 32 is identical to the header bar support structure 33' on cross-member 32', only the header bar support structure 33 on cross-member 32 will be described in detail with identical header bar support structure on cross-member 32' being designated by "'".

A running gear or rear wheel assembly 34 supports the rearward end of the frame 18. A wheeled hitch 36 is provided at the forward end of frame 18 in conventional fashion. A pair of identical header support brackets 38 and 40 are secured to frame member 28, as seen in FIG. 1.

Figure 5:
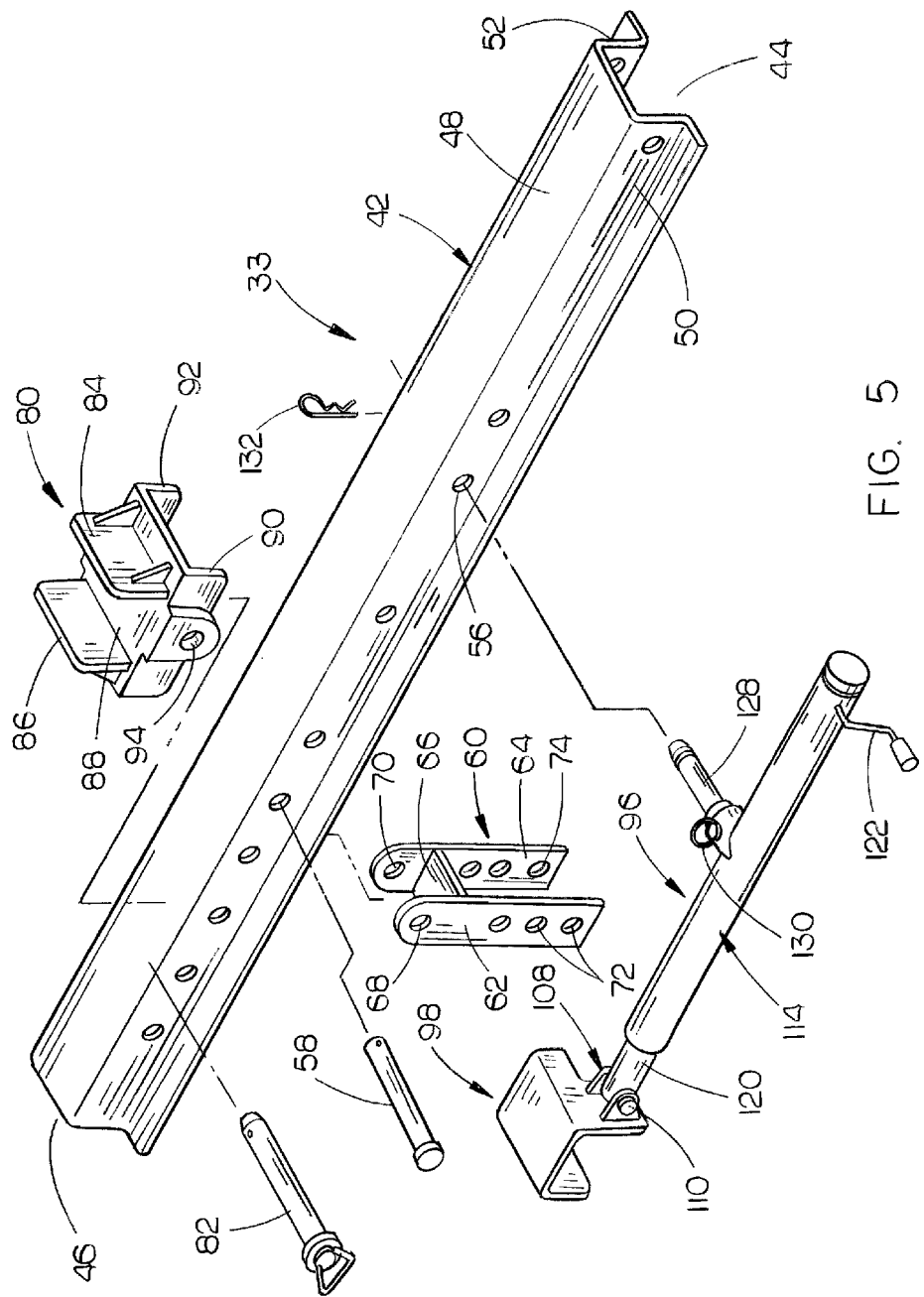
FIG. 5 is an exploded perspective view illustrating the manner in which the header bar adjustment assembly may be secured to the header bar support member.

Although the drawings illustrate two of the cross-members having header bar support structures thereon, additional header bar support structures could be provided if so desired. Header bar support structure 33 includes a first header bar support member 42 having an inner end 44 and an outer end 46. Header bar support member 42 includes a top wall 48 and side walls 50 and 52. The inner end 44 of header bar support member 42 is pivotally secured to cross-member 32 by a pivot pin 54. Side wall 50 of header bar support member 42 has an opening 56 formed therein with sidewall 52 having an opening formed therein which registers with opening 56 and with the openings being adapted to receive pivot pin 58 extending therethrough. Pivot pin 58 has a bore 59 formed therein as seen in FIG. 5.

The numeral 60 refers to an upstanding support which is comprised of spaced-apart plates 62 and 64 having a plate or bar 66 extending therebetween. The upper end of plate 62 has an opening 68 formed therein which registers with opening 70 formed in the upper end of plate 64. Plate 62 has a plurality of vertically spaced openings 72 formed therein which register with a plurality of vertically spaced openings 74 formed in plate 64. The upper end of support 60 is received between the side walls 50 and 52 of header bar support member 42 and is pivotally secured thereto by pin 58. Pin 58 extends through opening 56 in side wall 50 of header bar support member 42, through opening 68 of plate 62 of support 60, through opening 70 of plate 64 of support 60 and through the opening in side wall 52 of header bar support member 42 which registers with opening 56. A conventional cotter key or hairpin cotter (not shown) is inserted through the bore 59 in pin 58 to maintain pin 58 in position. The lower end of support 60 is adjustably vertically secured to cross-member 32 by pin 76.

Side wall 50 of header bar support member 42 has a plurality of spaced-apart openings 78 formed therein which register with openings formed in side wall 52 of header bar support member 42. The numeral 80 refers to a slider assembly which is selectively slidably adjustably mounted on header bar support member 42 by locking pin 82. Slider assembly 80 includes upstanding walls 84 and 86 which define a pocket 88 therebetween which receives header bar 89 therein. Slider assembly 80 also includes spaced-apart side walls 90 and 92 which slidably embrace header bar support member 42. Side wall 90 has an opening 94 formed therein. Side wall 92 has an opening formed therein which registers with opening 94. Pin 82 extends through opening 94, through one of the openings 78 in side wall 50 of header bar support member 42 through the opening in side wall 92 which registers with opening 94, and through an opening in side wall 52 of header bar support member 42 which registers with opening 78. A cotter key or hairpin cotter maintains pin 82 in place.

The numeral 96 refers to a header bar adjustment assembly which is used with header bar support structure 33. An identical header bar adjustment assembly is used with header bar support structure 33' and is designated by the reference numeral 96'. Since header bar adjustment assembly 96' is identical to header bar adjustment assembly 96, only header bar adjustment assembly 96 will be described in detail, with "'" indicating identical structure on header bar adjustment assembly 96'. Although it is preferred that a pair of header bar adjustment assemblies be used, a single header bar adjustment assembly 96 could be first used to adjust the forward end of the header bar and then be used with header bar support structure 33' to adjust the rearward end of header bar 89.

Assembly 96 includes a generally inverted U-shaped bracket 98 which includes a top wall 100, an outer side wall 102 which extends downwardly from the outer end of top wall 100, and an inner side wall 104 which extends downwardly from the inner end of top wall 100. As seen, side wall 104 has a cut-out 106 formed therein. Clevis 108 is secured to the inner side of side wall 104 adjacent the lower end thereof by welding. The numeral 110 refers to a clevis pivot pin which may be inserted through clevis 108 and held therein by hairpin cotter 112.

Assembly 96 also includes an elongated, manually operable or mechanical jack 114 having a base end 116 and a shaft end 118. An extendable and retractable shaft 120 extends from shaft end 118 of jack 114 in conventional fashion. Shaft 120 is manually extended and retracted by the side mounted crank 122. As seen, the outer end of shaft 120 is selectively pivotally secured to clevis 108 by the pivot pin 110. Jack 114 has a collar 124 welded to one side thereof which extends transversely therefrom. The enlarged inner end 126 of pivot pin 128 is received within collar 124 and is held therein by pin 130. A hairpin cotter 132 may be secured to the outer end of pivot pin 128.

Figure 7:
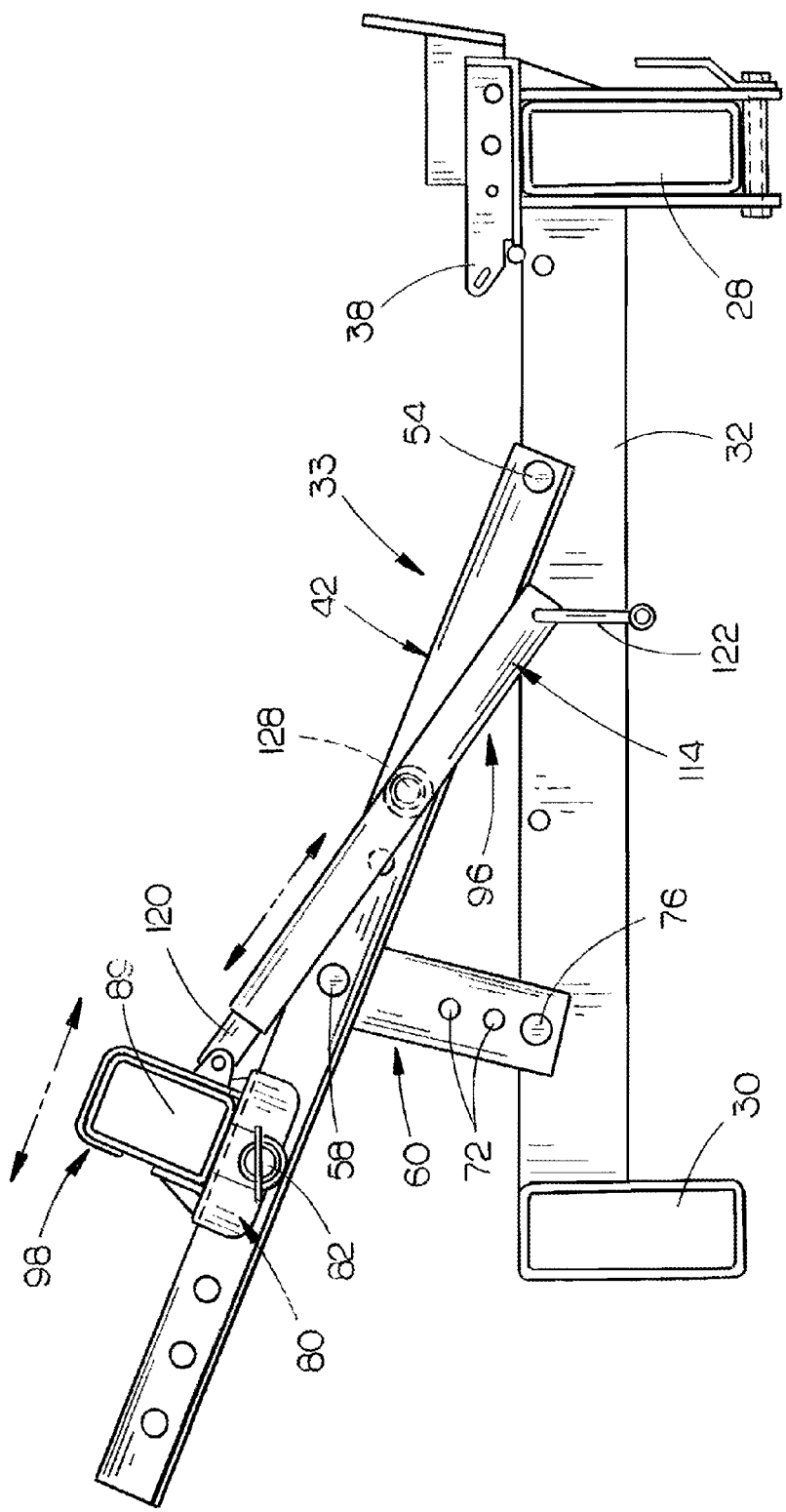
FIG. 7 is a front view of the header bar adjustment assembly being used to move the header bar inwardly or outwardly on the header bar support member.
Figure 8:
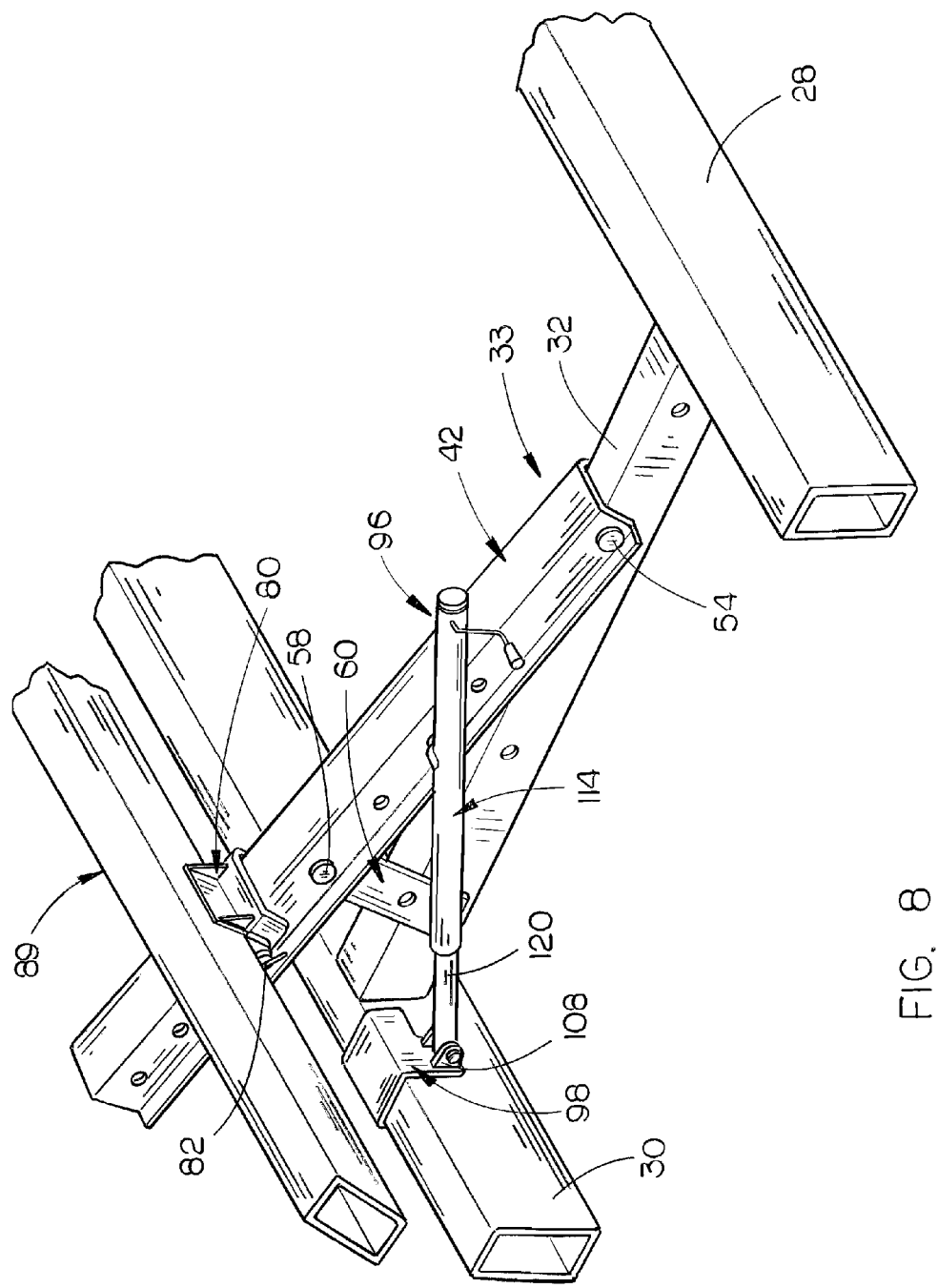
FIG. 8 is a perspective view illustrating the manner in which the header bar adjustment assembly may be used to raise or lower the header bar.

Initially, prior to the header 12 being placed onto the trailer 10, the header bar support member 42 will be in a fixed position as determined by the support 60. The slider assembly 80 will also be in a fixed position relative to the header bar support member 42 by pin 82. If it is desired to longitudinally move the slider assembly 80 inwardly or outwardly with respect to the header bar support member 42 to accommodate a particular header 12, the pivot pin 128 of jack 114 will be pivotally secured about a horizontal axis, to header bar support member 42 by inserting pivot pin 128 through opening 56 in side wall 50 and through the opening in side wall 52 which registers with opening 56. Hairpin cotter 132 is then attached to the exposed outer end of pivot pin 128. Bracket 98 is then positioned on header bar 89, as seen in FIG. 7. The shaft 120 of jack 114 is then extended or retracted so that the outer end of shaft 120 may be pinned to clevis 108 by means of pin 110. The shaft 120 is then manually extended slightly to relieve the pressure on pin 82. Pin 82 is then removed so that slider assembly 80 is free to be moved with respect to header bar support member 42. If slider assembly 80 is to be moved outwardly on header bar support member 42, shaft 120 is then extended from jack 114 which causes slider assembly 80 to be moved outwardly on header bar support member 42 until it is in the desired position. If the slider assembly 80 is to be moved inwardly on header bar support member 42, the shaft 120 is retracted into jack 114 which causes slider assembly 80 to move inwardly on header bar support member 42 until it is in the desired position. When the slider assembly 80 is in the proper position, pin 82 is inserted through slider assembly 80 and header bar support member 42 to maintain the slider assembly 80 in that position.

Figure 9:
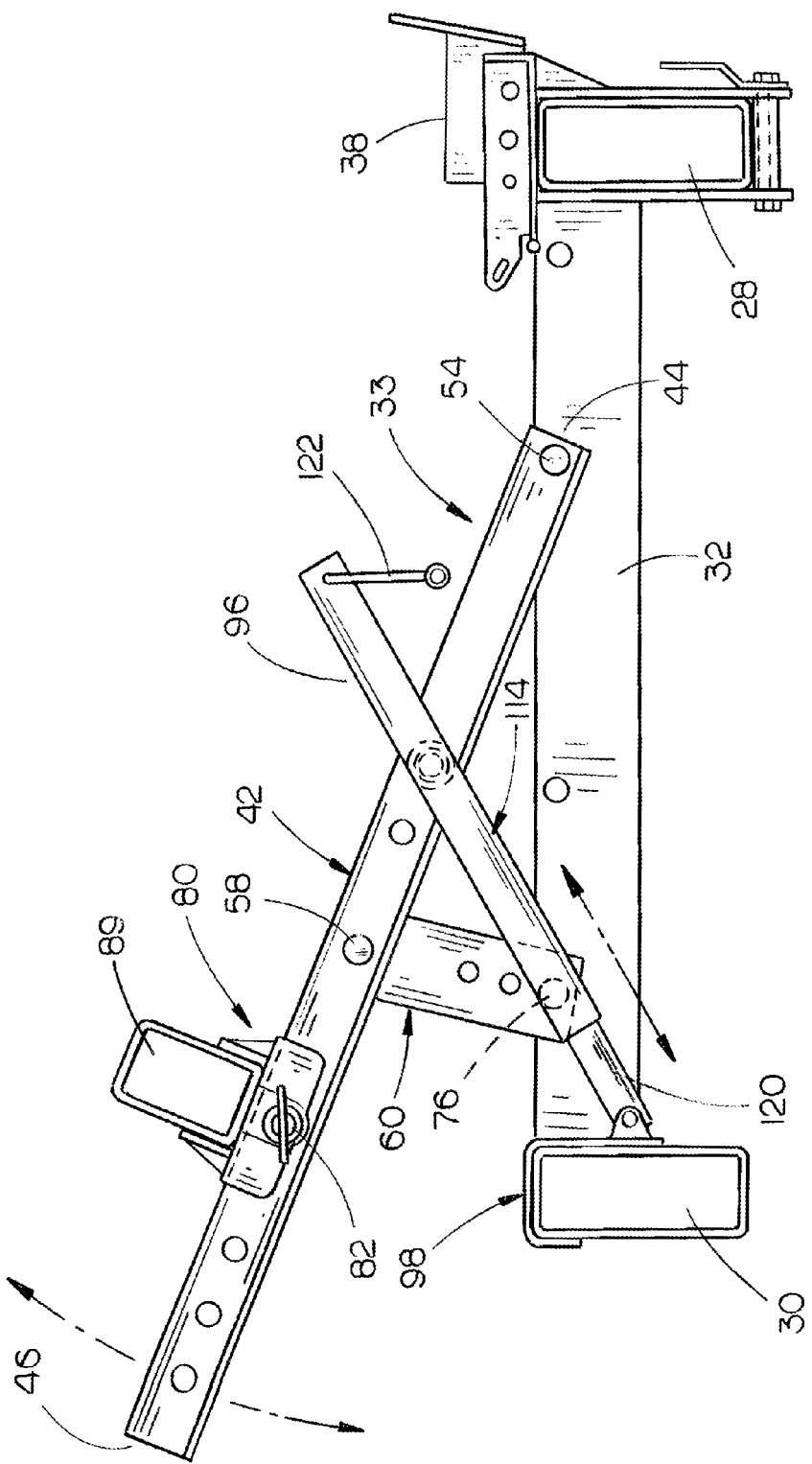
FIG. 9 is a partial front view illustrating the header bar adjustment assembly being used to raise or lower the header bar.

If it is desired to raise or lower the outer end of header bar support member 42 and the header bar 89 thereon, the shaft 120 of jack 114 is normally disconnected from clevis 108. The bracket 98 is then placed onto the frame member 30, as seen in FIG. 9. The shaft 120 is then again connected to clevis 108 by pin 110. Shaft 120 is then extended slightly to remove pressure on pin 76. Pin 76 is then removed. If the outer end of header bar support member 42 is to be raised, shaft 120 of jack 114 is extended which raises the outer end of header bar support member, slider assembly 80 and header bar 89. If the outer end of header bar support member 42 is to be lowered, shaft 120 of jack 114 is retracted which causes the outer end of header support member, slider 80 and header bar 89 to be lowered. When header support bar member 42 is in the desired position, pin 76 is again inserted through the appropriate opening 72 in plate 62 and the appropriate opening 74 in plate 64.

The header bar adjustment assembly 96' at the rearward end of the trailer 10 is then utilized to adjust the rearward end of the header bar 89. Although it is preferred that a pair of the header bar adjustment assemblies be utilized, the header bar adjustment assembly 96 could also be used at the rearward end of the trailer.

Figure 6:
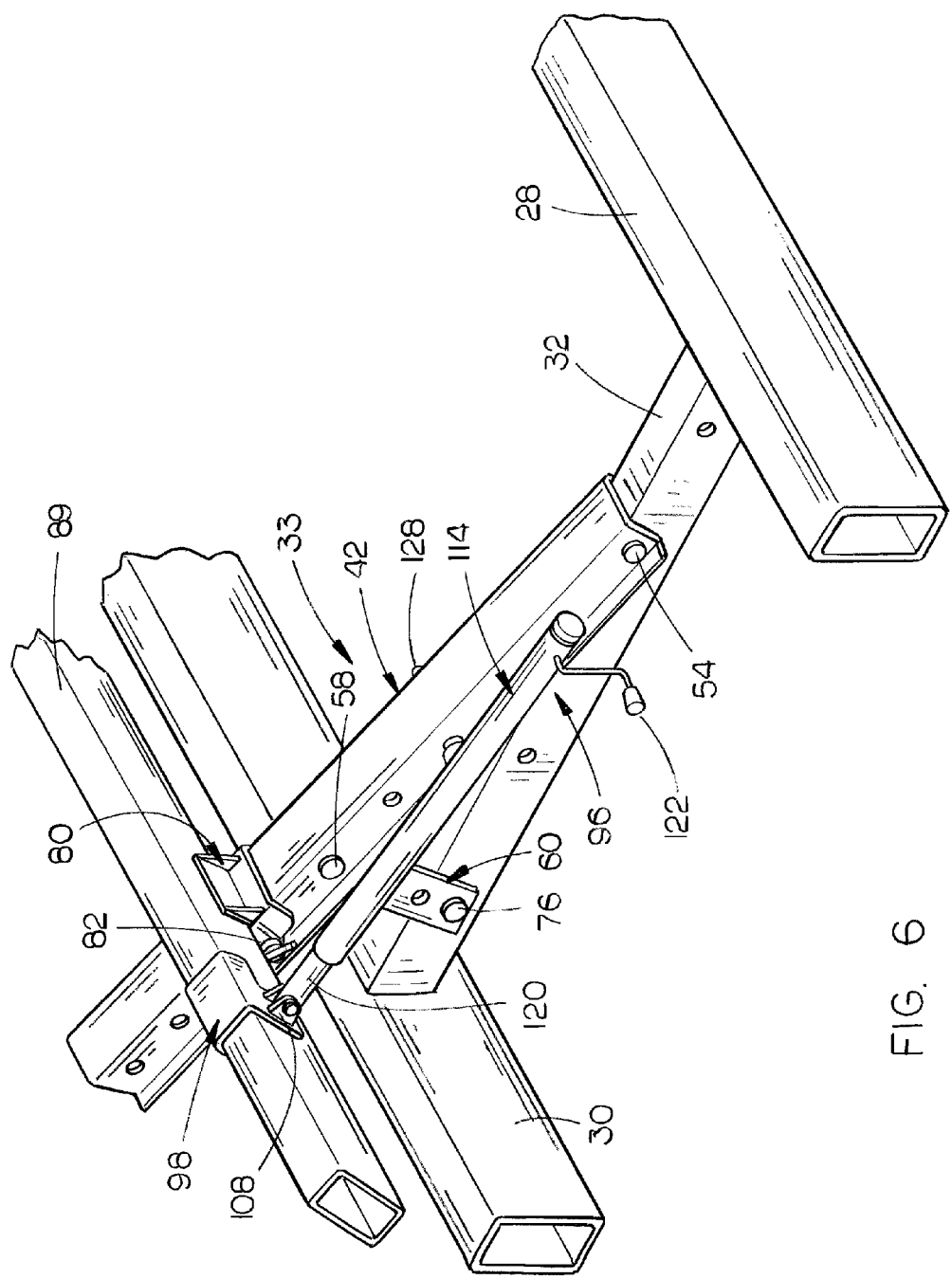
FIG. 6 is a partial perspective view illustrating the header bar adjustment assembly being used to move the header bar inwardly or outwardly on the header bar support member.

If the header bar adjustment assemblies 96 and 96' are to be left on the trailer 10 after adjusting the header bar 89, the header bar adjustment assemblies would be positioned, such as seen in FIG. 6, so that jack 114 is essentially parallel to header bar support member 42 and positioned somewhat below the top wall 48 of header bar support member 42 so that the header 12 will not come into contact with jack 114.

Thus, it can be seen that the combine header transport trailer of this invention accomplishes at least all of its stated objectives. The header bar adjustment assembly(ies) of this invention permits one person to quickly and easily adjust the header bar upwardly, downwardly, inwardly and outwardly without tools.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A trailer for the endwise transport of a combine header with the combine header having a forward end, a rearward end, a first end and a second end, comprising:

an elongated wheeled frame having a forward end, a rearward end, a first side, and a second side;

said wheeled frame including elongated and longitudinally extending first and second horizontally spaced-apart frame members, having forward and rearward ends;

a first cross-member having first and second ends;

said first cross-member being secured to said first and second frame members and extending therebetween rearwardly of said forward end of said frame;

a second cross-member having first and second ends;

said second cross-member being secured to said first and second frame members forwardly of said rearward end of said frame;

said first ends of said first and second cross-members being secured to said first frame member;

said second ends of said cross-members being secured to said second frame member;

a first elongated, transversely extending header bar support member having inner and outer ends;

said inner end of said first header bar support member being pivotally secured to said first cross-member, about a horizontal axis, between said first and second ends of said first cross-member so as to extend therefrom towards said second frame member whereby said outer end of said first header bar support member is disposed laterally outwardly and above said second frame member;

a first slider assembly selectively longitudinally slidably adjustably mounted on said first header bar support;

said first slider assembly including a selective locking pin for locking said first slider assembly to said first header bar support member in various positions with respect thereto;

a first support having upper and lower ends;

said upper end of said first support being pivotally secured to said first header bar support member between said inner and outer ends of said first header bar support member;

said lower end of said first support being selectively vertically adjustably secured to said first cross-member;

a second elongated, transversely extending header bar support member having inner and outer ends;

said inner end of said second header bar support member being pivotally secured to said second cross-member between said first and second ends of said second cross-member so as to extend therefrom towards said second frame member whereby said outer end of said second header bar support member is disposed laterally outwardly and above said second frame member;

a second slider assembly selectively longitudinally slidably adjustably mounted on said second header bar support member;

said second slider assembly including a selective locking pin for selectively locking said second slider assembly to said second header bar support member in various positions with respect thereto;

a second support having upper and lower ends;

said upper end of said second support being pivotally secured to said second header bar support member between said inner and outer ends;

said lower end of said second support being selectively vertically adjustably secured to said second cross-member;

an elongated and longitudinally extending header bar having a forward end, and a rearward end;

said header bar being mounted on said first and second slider assemblies and extending therebetween for movement therewith;

a first header bar adjustment assembly for use with said first header bar support member;

said first header bar adjustment assembly including a first support bracket and a first elongated mechanical jack;

said first support bracket having a generally inverted U-shape with an upstanding first side wall with an upper end, a lower end, an inner side, and an outer side;

said first support bracket also having a top wall which extends horizontally from said upper end of said first side wall having inner and outer ends, and a second side wall which extends downwardly from said outer end of said top wall;

said first elongated mechanical jack having a base end, a shaft end, and an extendable and retractable shaft extending from said shaft end;

said first elongated mechanical jack having a pivot pin extending transversely therefrom between said base end and said shaft end thereof;

said pivot pin of said first elongated mechanical jack being pivotally secured to said first header bar support member about a horizontal axis which is transverse with respect to the longitudinal axis of said first header bar support member;

said shaft of said first elongated mechanical jack being pivotally secured to said first side wall of said first support bracket;

said first support bracket being configured so as to selectively embrace said header bar, when in a first position, and to selectively embrace said second frame member when in a second position;

the extension of said shaft of said first elongated mechanical jack, when said first support bracket is in said first position and said first slider assembly is unlocked from said first header bar support member, causing said first slider assembly and said header bar to be moved outwardly on said first header bar support member;

the retraction of said shaft of said elongated first mechanical jack, when said first support bracket is in said first position and said first slider assembly is unlocked from said first header bar support member, causing said first slider assembly and said header bar to be moved inwardly on said first header bar support member;

the extension of said shaft of said first elongated mechanical jack, when said first support bracket is in said second position, causing said outer end of said first header bar support member, said first slider assembly and said header bar to be moved upwardly;

the retraction of said shaft of said first elongated mechanical jack, when said first support bracket is in said second position, causing said outer end of said first header bar support member, said first slider assembly and said header bar to be moved downwardly;

a second header bar adjustment assembly for use with said second header bar support member;

said second header bar adjustment assembly including a second support bracket and a second elongated mechanical jack;

said second support bracket having a generally inverted U-shape with an upstanding first side wall with an upper end, a lower end, an inner side, and an outer side;

said second support bracket also having a top wall which extends horizontally from said upper end of said first side wall having inner and outer ends, and a second side wall which extends downwardly from said outer end of said top wall;

said second elongated mechanical jack having a base end, a shaft end, and an extendable and retractable shaft extending from said shaft end;

said second elongated mechanical jack having a pivot pin extending transversely therefrom between said base end and said shaft end thereof;

said pivot pin of said second elongated mechanical jack being pivotally secured to said second header bar support member about a horizontal axis which is transverse with respect to the longitudinal axis of said second header bar support member;

said shaft of said second elongated mechanical jack being pivotally secured to said first side wall of said second support bracket;

said second support bracket being configured so as to selectively embrace said header bar, when in a first position, and to selectively embrace said second frame member when in a second position;

the extension of said shaft of said second elongated mechanical jack, when said second support bracket is in said first position and said second slider assembly is unlocked from said second header bar support member, causing said second slider assembly and said header bar to be moved outwardly on said second header bar support member;

the retraction of said shaft of said second mechanical jack, when said second slider assembly is unlocked from said second header bar support member, causing said second slider assembly and said header bar to be moved inwardly on said second header bar support member;

the extension of said shaft of said second elongated mechanical jack, when said second support bracket in said second position, causing said outer end of said second header bar support member, said second slider assembly and said header bar to be moved upwardly;

the retraction of said shaft of said second mechanical jack, when said second support bracket is in said second position, causing said outer end of said second header bar support member, said second slider assembly, and said header bar to be moved downwardly.

2. A trailer for the endwise transport of a combine header with the combine header having a forward end, a rearward end, a first end and a second end, comprising:

an elongated wheeled frame having a forward end, a rearward end, a first side, and a second side;

said wheeled frame including elongated first and second horizontally spaced-apart frame members, having forward and rearward ends, which have a plurality of spaced-apart cross-members, having first and second ends, secured to said first and second frame members and which extend therebetween;

said first ends of said cross-members being secured to said first frame member;

said second ends of said cross-members being secured to said second frame member;

a first elongated, transversely extending header bar support member having inner and outer ends;

said first header bar support member having its said inner end pivotally secured, about a horizontal axis, to one of said cross-members rearwardly of said forward end of said frame;

said inner end of said first header bar support member being pivotally secured to the respective cross-member between said first and second ends thereof so as to extend therefrom towards said second frame member whereby said outer end of said first header bar support member is disposed laterally outwardly and above said second frame member;

a first slider assembly selectively slidably adjustably mounted on said first header bar support;

said first slider assembly including a selective locking pin for locking said first slider assembly to said first header bar support member;

a first support having upper and lower ends;

said upper end of said first support being pivotally secured to said first header bar support between said inner and outer ends thereof;

said lower end of said first support being selectively vertically adjustably secured to the respective cross-member;

a second elongated, transversely extending header bar support member having inner and outer ends;

said second header bar support member having its said inner end pivotally secured, about a horizontal axis, to one of said cross-members forwardly of said rearward end of said frame;

said inner end of said second header bar support member being pivotally secured to the respective cross-member between said first and second ends thereof so as to extend therefrom towards said second frame member whereby said outer end of said second header bar support member is disposed laterally outwardly and above said second frame member;

a second slider assembly selectively slidably adjustably mounted on said second header bar support member;

said second slider assembly including a selective locking pin for selectively locking said second slider assembly to said second header bar support member;

a second support having upper and lower ends;

said upper end of said second support being pivotally secured to said second header bar support member between said inner and outer ends thereof;

said lower end of said second support being selectively vertically adjustably secured to the respective cross-member;

an elongated and longitudinally extending header bar having a forward end, and a rearward end;

said header bar being mounted on said first and second slider assemblies and extending therebetween;

a mechanical jack means for selectively moving each of said first and second slider assemblies inwardly or outwardly with respect to said first and second header bar support members respectively;

said mechanical jack means also being configured to selectively raise and lower each of said outer ends of said first and second header bar support members.

3. A header bar adjustment assembly for adjusting a header bar on a combine header transport trailer with the trailer including an elongated wheeled frame with a forward end, a rearward end, a first side, a second side, first and second elongated and longitudinally extending frame members having forward and rearward ends, a first transversely extending header bar support member, having inner and outer ends, with the inner end of the first transversely extending header bar support member being pivotally secured about a horizontal axis to the wheeled frame, a first slider member selectively longitudinally movably mounted on the first header bar support member inwardly of the outer end of the first header bar support member, a second transversely extending header bar support member having inner and outer ends, with the inner end of the second header bar support member being pivotally secured about a horizontal axis to the wheeled frame, a second slider member selectively longitudinally movably mounted on the second header bar support member inwardly of the outer end of the second header bar support member, and a horizontally disposed header bar mounted on the first and second slider members and extending therebetween, for movement with the first and second slider members, the header bar adjustment assembly comprising:

an elongated mechanical jack having a base end, a shaft end, and an extendable and retractable shaft extending from said shaft end which has an outer end;
said mechanical jack having a pivot pin extending transversely therefrom between said base end and said shaft end thereof;
a generally inverted U-shaped bracket;
said outer end of said shaft being pivotally secured to said bracket;
said pivot pin being pivotally secured, about a horizontal axis, to one of the first and second header bar support members between the inner and outer ends of the respective header bar support member;
said U-shaped bracket being configured so as to be positioned on the header bar whereby extension of said shaft of said mechanical jack causes the header bar and said slider member to be moved outwardly on the respective header bar support member and whereby retraction of said shaft of said mechanical jack causes the header bar and the respective slider member to be moved inwardly on the respective header bar support member;
said U-shaped bracket also being configured so as to be positioned on the second frame member whereby extension of said shaft of said mechanical jack causes the outer end of the respective header bar support member and the header bar to be moved upwardly with respect to the wheeled frame and whereby retraction of said shaft of said mechanical jack causes the outer end of the respective header bar support member to be lowered.

\* \* \* \* \*